July 21, 1964
G. ECKMAN
3,141,218
SPRING CLIP
Filed Dec. 10, 1962
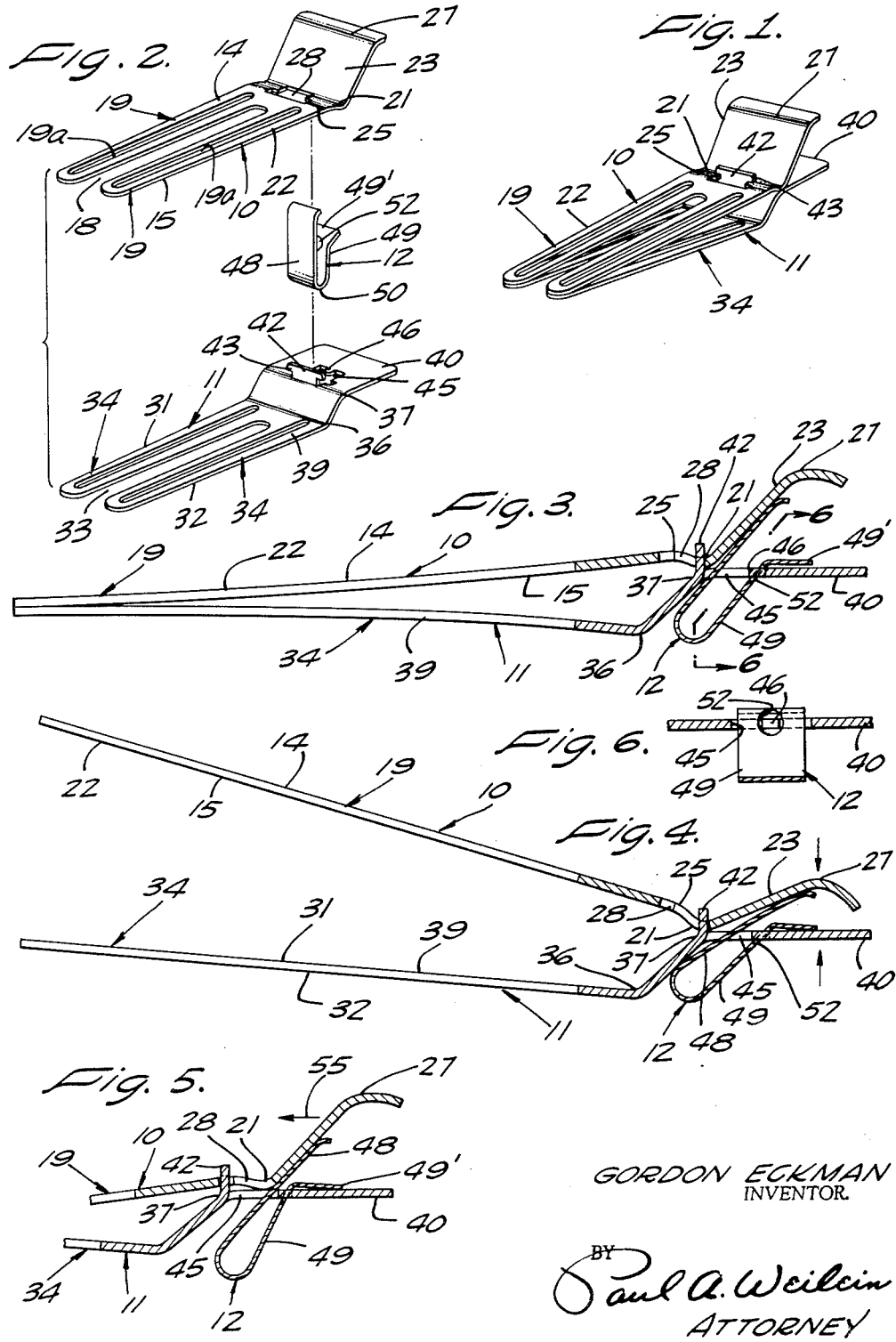
GORDON ECKMAN
INVENTOR.
BY Paul A. Weilein
ATTORNEY

United States Patent Office 3,141,218
Patented July 21, 1964

3,141,218
SPRING CLIP
Gordon Eckman, Fullerton, Calif., assignor to Kaynar Mfg. Co., Inc., Fullerton, Calif., a corporation of California
Filed Dec. 10, 1962, Ser. No. 243,461
16 Claims. (Cl. 24—252)

The present invention relates generally to spring clips which are designed for holding together papers or other articles, and more especially to a clip which is particularly designed for holding curls of hair, although it will be understood that in the broader aspects of the present invention the use to which the spring clip is put is not limitative upon the invention.

Clips of this character generally have two elongated lever members which are interconnected for pivotal movement relative to each other and which include a spring that urges the jaw portions of the clips into contact with each other. It has been found advantageous in manufacture to make this spring a separate member distinct from either of the lever members. Thus, the spring can be made from strong resilient material, such as spring steel, and then suitably heat treated after shaping to perform its function of urging the lever members together. The lever members can then be made from other metal, as for example aluminum or an aluminum alloy, which is lighter in weight, more economical, and less subject to corrosion or oxidation.

Thus, it is a general object of the present invention to provide a spring clip of the above character using a discrete spring member, which is novel in design, rugged in construction, and at the same time economical to manufacture.

This object has been achieved according to the present invention by providing a spring clip comprising two elongated lever members of generally similar shape, each having an inside face opposing the inside face of the other lever member; fulcrum means formed integrally with the two lever members and establishing a transverse axis about which the two members pivot relative to each other; and spring means consisting of a separate member of novel design engaging the two lever members at one side of the fulcrum in order to urge the jaw portions at the other side of the fulcrum toward each other. The fulcrum means comprises an aperture in one lever member and a tab struck upwardly from the other lever member and passing through said aperture, said tab having lateral extensions that overhang the edges of the aperture to hold the two lever members against the force of the spring tending to separate the levers while at the same time permitting relative pivotal movement of the lever members. The spring is a U-shaped or bow spring having two arms which are joined by a central bight portion, the arms each bearing against the respective inside faces of the lever members at one side of the fulcrum with the bight portion of the spring extending through a slot in one of the lever members.

How the above and other objects and advantages of the present invention are achieved, will be more readily understood by reference to the following description and to the annexed drawing, in which:

FIG. 1 is a perspective view of an assembled spring clip embodying the present invention;

FIG. 2 is an exploded perspective showing the three separate parts of the spring clip;

FIG. 3 is an enlarged longitudinal median section through the spring clip with the jaws in closed position;

FIG. 4 is a view similar to FIG. 3 with the jaws in open position;

FIG. 5 is a fragmentary longitudinal section showing the positions occupied by the two lever members at one stage in the assembly of the spring clip; and FIG. 6 is a section on line 6—6 of FIG. 3.

Referring now to the drawing, and particularly to FIGS. 1 and 2, it will be seen that the spring clip shown therein consists of an upper lever member 10, a lower lever member 11, and a spring 12. The lever members may be of any suitable material, for example, metal or a synthetic resin. Typically, the lever members illustrated may be stamped from a flat sheet of steel or aluminum or aluminum alloy since these materials afford a lightweight construction along with various other advantages. The spring 12 is made of resilient material such as spring steel which may be hardened by suitable heat treatment after being bent to the shape shown, the spring being stamped from an original flat strip of material and then formed in any suitable manner.

It is apparent from FIG. 2, that lever member 10 has an outside face 14 and an inside face 15, and that the side edges of this lever member are straight and closely parallel to each other. The center of the lever member 10 is cut out to form two generally parallel arms 19 separated by a narrow opening 18 which extends to one end of the lever member. Optionally, each of the arms 19 may have an elongate slot 19a to admit air to the hair held by the clip.

The lever member 10 has a transversely extending bend 21 which, as can be seen clearly in FIG. 2, provides an upwardly concave depression extending across the member, the reasons for which will become more apparent. This transverse bend serves to divide lever member 10 into two principal portions, the jaw portion 22 to the left of the bend, as viewed in the drawings, and the grip portion 23 to the right of the bend. These two main portions of lever member 10 make an angle with respect to one another at the bend in order to permit pivotal movement of the two lever members relative to each other, as will become apparent.

The upper lever member also has another transverse bend at 25 which is upwardly convex and the chief purpose of which is to assist in defining more clearly the concave shape of the lever at bend 21.

A third transverse bend at 27 is also preferably provided in lever member 10 near the outer end of the grip portion 23 and provides a comfortable thumb rest for the user.

Lever 10 is provided with an aperture 28, one end of which is located at the bottom of transverse bend 21. Although apertures of other shapes may be used, it is preferred that the aperture be generally T-shaped with the broader end of the aperture remote from bend 21.

Turning now to lever member 11, it likewise may be stamped from a flat sheet of material like the lever member 10 and has substantially the same general shape and overall dimensions as the latter. Thus, it will be seen that the lever member 11 has an upper or inside surface 31 and a lower or outside surface 32. The center of the lever member 11 is cut away to provide two arms 34 generally parallel to each other which are separated by a narrow elongated opening 33 which opens to the same end of the clip as opening 18 so that the arm portions overlie and engage the corresponding arms of the jaw portion of the lever member 10. The arms 34 may each have an elongated slot therein.

From the drawing it will be seen that lever member 11 has two transversely extending bends at 36 and 37 which are substantially equal in amount but opposite in direction. The bend 37 divides the lever member into a forward or jaw portion 39 and a rearward or grip portion 40, the principal subdivisions of the lever member 11.

The lever member 11 is provided with a tab 42 which is integral with the lever member and struck upwardly therefrom to provide fulcrum means for relative pivotal movement of the lever. The tab as shown, is T-shaped and joined at its base to the lever member substantially at transverse bend 37. The purpose of this shape of the tab is to provide a pair of lateral extensions 43, one on either side of the narrow stem portion of the tab, that engage the lever member 10, as will be explained, to establish a fulcrum for relative pivotal movement of the levers.

The operation of forming the tab 42 leaves in the grip portion of the lower lever member an opening 45, which is preferably somewhat enlarged over the size of the tab alone in order to provide at the rear edge of opening 45 remote from tab 42 a short projection 46.

The spring 12 is a bow-formed spring comprising two arms 48 and 49 connected by a centrally located bight portion 50. Arm 49 has an angular extended free end 49′ and is provided with an opening 52 as may be seen in FIGS. 2 and 6, located in inwardly spaced relation to the end 49′.

In order to assemble the clip, spring 12 is first inserted downwardly in opening 45 of the lever member 11 to bring the bight portion 50 of the spring at the under or outer side of the lever member when the spring is fully inserted in aperture 45, opening 52 in the spring receives projection 46 at the rear edge of opening 45. The projection and aperture form anchor means holding the spring against movement into and out of the aperture. At this time the angularly extended end 49′ of spring arm 49 rests upon the upper or inside surface of the grip portion 40 of the lever member 11. The other spring arm 48 extends upwardly above the lever member 11.

The next step in assembling is to bring the lever member 10 into position over the lever member 11 so that by lowering the member 10 the upper end of tab 42 is passed upwardly through the enlarged section of aperture 28 in lever member 10. The inside surface of the grip portion 23 now bears against the upstanding arm 48 of spring 12. The parts are thus in the position illustrated in FIG. 5. By now moving lever member 10 forwardly in the direction of arrow 55 relative to the lever member 11, the narrow stem portion of tab 42 is moved into the narrow portion of aperture 28, bringing tab 42 substantially into the concave portion of the upper lever member at bend 21, as shown in FIG. 3. Now the lateral extensions 43 of the tab 42 overhang the edges of aperture 28 and engage the upper or outside surface 14 of the lever member 10. The pressure of spring 12 is in a direction that would normally push the two lever members apart, were it not for the engagement of the lever member 10 by T-shaped tab 42.

The concavity in surface 14 at transverse bend 21 receives and holds the head of the T-shaped tab 42. The slope at the end 21 up and away from the head of the tab 42 at each side thereof forms a saddle that holds the tab against shifting longitudinally of lever member 10 under the force of spring 12 or any forces imposed by manipulating the spring clip.

The tab and slot arrangement provides means integral with the lever members which interconnect the levers and provide a fulcrum at tab 42 establishing the transverse axis about which the two members can pivot relative to each other. The arms of spring 12 normally tend to spread apart. One result of this is that the forces applied by the spring to the lever members tend to separate the lever members. Separation is resisted by engagement of the lower edge of extensions 43 with outside face 14 of upper lever 10 and the tension reaction in tab 42 which is integral with lower lever 11. Hence, the transverse axis of relative movement is at the lower edge of extensions 43.

The spring arms 48 and 49 bear against the inside faces of the grip portions 23 and 40 of the two lever members, whereby the forces applied by the spring 12 to the levers are in a direction to urge the jaw portions thereof toward each other. When nothing is held between the two jaw portions, they engage one another as shown in FIG. 3. By grasping the grip portions between the thumb and forefinger and applying pressure to move the grip portions toward each other to the position of FIG. 4, the ends of bow spring 12 are brought closer together and the jaw portions of the two lever members are separated as shown in FIG. 4 to permit insertion between them of an object or objects to be gripped by the clip. This relative pivotal movement of the two levers is made possible by the angular disposition of the grip portion 23 of one of the members with respect to its jaw portion 22 and also with respect to the other grip portion 40, thus permitting the upper lever to rock relative to the lower lever about the fulcrum established by extensions 43. A greater range of movement can be obtained by also bending the other lever member 11; but it will be realized that substantial range of movement can still be obtained even if the lever 11 is substantially a flat member instead of having the two transverse bends in it as shown.

However, it is preferred to provide the two transverse bends. As may be seen clearly by comparing FIGS. 3 and 4, the spring extending through slot 45 in lever member 11 may at times have no contact with the outside face of lever 11. However, depending on the exact configuration of the spring and the lever members, there may be contact between lever member 11 and the spring at a position near the bight end of the spring when the jaws are open. When the jaws are opened as in FIG. 4, the stresses in the spring may change its shape or position to bring the spring into contact with the outer face of the lower lever member at some position between the two transverse bends 36 and 37 or at the edge of opening 45, depending on the shape of the parts. Actually, this contact area may shift somewhat as the levers move apart between the closed and open positions as illustrated in FIGS. 3 and 4, respectively. Another advantage of the bend at 37 is that the spring is thereby protected much more than it would be if it merely projected beyond a flat outside surface of the lever member 11.

The shape of aperture 28 in the lever member 10 can be varied somewhat while retaining the T-shape of tab 42. Likewise, the shape of tab 42 can be varied somewhat from the T-shape illustrated and still provide the overhanging lateral extensions 43. In general, any shape of aperture 28 may be used that has a wide portion wide enough to permit insertion therethrough of the widest portion (at the end) of the tab 42, and a narrow portion substantially the width of the narrower or stem portion of tab 42. The two portions of the aperture 28 are disposed longitudinally of the lever member relative to each other so that, after insertion of the tab in the wide end of the aperture, the tab can be moved from one portion of the aperture to the other by relative longitudinal movement of the two lever members. The thrust of spring 12 on the two lever members has a longitudinal component in a direction to keep the tab always at the narrow end of the aperture 28, thus holding the two lever members in assembled position. Of course, the parts can be manually disassembled at any time by reversing the assembly steps described.

It will be understood that these and various other changes in the detailed construction and arrangement of the parts of this spring clip constituting the invention will occur to persons skilled in the art without departing from the spirit and scope of the present invention. Accordingly, it is to be understood that the foregoing description is considered to be illustrative of, rather than limitative upon, the invention as defined by the appended claims.

I claim:

1. A spring clip comprising: two elongated lever members each having an inside and an outside face and each also having a grip portion and a jaw portion; said members being arranged with their inside faces opposing each other; fulcrum means establishing an axis about which the two members pivot relative to each other; said fulcrum means comprising at least one tab struck from one lever member and extending from the inside face of said one lever member past the other lever member, said tab having means engaging the outside surface of said other lever member to hold the two lever members against separation while permitting relative pivotal movement thereof; and spring means engaging the two lever members on the grip side of the fulcrum means to urge the jaw portions toward each other; said spring means having a portion extended opposite the outside face of a part of the jaw portion of said one lever member adjacent said fulcrum means.

2. A spring clip comprising: two elongated lever members each having an inside and outside face and each also having a grip portion and a jaw portion; said members being arranged with their inside faces opposing each other; one lever member having a transversely extending bend at the junction of the jaw and grip portions thereof; fulcrum means establishing an axis about which the two lever members pivot relative to each other; said fulcrum means comprising an aperture in one lever member and a tab struck from the other lever member and extending from the inside face of said other lever member; said tab passing through said aperture and having lateral extensions overhanging the edges of the aperture at one end thereof to engage the outside face of said other lever member to hold the two lever members against separation while permitting relative pivotal movement; and spring means engaging the two lever members on the grip side of the fulcrum means to urge the jaw portions toward each other; said spring means having one arm which is engaged with the grip portion on one of said levers and is engageable with the outside face of the other of said levers adjacent said fulcrum means.

3. A spring clip as in claim 2 in which the tab and the aperture are both T-shaped and the respective parts of the aperture are subtantially the width of the corresponding parts of the tab to receive the stem of the tab in the narrow part of the aperture.

4. A spring clip as in claim 2 in which the transversely extending bend forms a concavity on the outside face of said one lever member, said concavity receiving said overhanging extensions of the tab.

5. A spring clip comprising: two elongated lever members each having an inside and an outside face and also each having a grip portion and a jaw portion; said lever members being arranged with the inside faces facing each other; fulcrum means about which the members pivot relative to each other; and a bow-shaped spring having two arms joined by a central bight portion, the arms bearing against the respective inside faces of the grip portions of the lever members, one of said lever members having a slot in the grip portion thereof and said spring extending through said slot with one of said arms engaging the grip portion of the other lever member and disposed for engagement with the outside face of said one lever member at a point forwardly of said fulcrum means.

6. A spring clip comprising: a pair of elongated members having opposed jaw portions and opposed grip portions; said jaw and grip portions having inner and outer surfaces; fulcrum means adjacent the juncture of said jaw and grip portions joining said members for relative pivotal movement with said inner surfaces of said jaw and grip portions facing one another; the grip portion of one of said members having an opening therein; and a spring extended through said opening with portions thereof engaged with the inner surfaces of said grip portions and another portion thereof engageable with the outer surface of said one member adjacent the juncture of the jaw and grip portions of said one member, whereby said spring exerts a force on said grip portions urging said jaw portions toward one another.

7. A spring clip comprising: a pair of elongate members having opposed jaw portions and opposed grip ortions; said jaw and grip portions having inner and outer surfaces; fulcrum means adjacent the juncture of said jaw and grip portions joining said members for relative pivotal movement with said inner surfaces of said jaw portions and grip portions facing one another; the grip portion of one of said members having an opening therein; and a spring extended through said opening with portions thereof engaged with the inner surfaces of said grip portions and another portion thereof extending beyond and being engageable with the outer surface of said one member adjacent the juncture of the jaw and grip portions of said one member; said spring having an opening therein; and a projection on said grip portion of said one member extending into said opening in said spring.

8. A spring clip comprising: a pair of elongate members having opposed jaw portions and opposed grip portions; said jaw and grip portions having inner and outer surfaces; fulcrum means adjacent the juncture of said jaw and grip portions joining said members for relative pivotal movement with said inner surfaces of said jaw portions and grip portions facing one another; and a bowed spring having a pair of arms joined by a bight portion; the grip portion of one of said members having an opening therein and said spring extending through said opening so that said bight portion is disposed to one side of said grip portion of said one member with one of said spring arms engaged with the inner surface of the grip portion of said one member; the other of said arms being engaged with the inner surface of the grip portion of the other of said members and being engageable with the outer surface of said one member adjacent said fulcrum means whereby said arms exert a force on the grip portions urging said jaw portions toward one another.

9. A spring clip comprising: two elongated members each having an inside and an outside surface and also each having a grip portion and a jaw portion; said members being arranged with the inside surfaces facing each other; one of said members having a slot in the grip portion thereof; fulcrum means about which the members pivot relative to each other; and a U-shaped spring having two arms joined by a central bight portion, the arms each bearing against the respective inside surfaces of the grip portions of said members, and the bight portion extending through said slot in said grip portion; one of said arms having an end portion engageable with the outside surface of said one member forwardly of said slot; the other end portion of said arm engaging the grip portion of the other of said members.

10. A spring clip as in claim 9 which includes anchor means to hold the spring in the slot.

11. A spring clip as in claim 9 in which the spring has an aperture in one arm and said one member has a projection at one edge of said slot therein through which the spring passes, said projection entering the aperture in the spring to hold the spring against shifting.

12. A spring clip comprising: two elongated lever members each having an inside and an outside surface and each also having a grip portion and a jaw portion; said lever members being arranged with their inside faces opposing each other; fulcrum means establishing an axis about which the two lever members pivot relative to each other; said fulcrum means comprising an aperture in the jaw portion of one lever member and a tab having a wide end and a narrower stem struck from the grip portion of the other lever member and extending from the inside face of said jaw portion of said other lever member; said aperture and said tab being located in entirety on said jaw portions so as to extend forwardly of the points where said grip portions are joined to said jaw portions; said aperture having a wide portion to receive the wide end of the tab and a narrower portion to receive the stem of the tab upon relative longitudinal movement of the two lever members; the wider end portion of the tab overhanging the edges of the aperture when the tab stem is in the narrower portion of the aperture to hold the two lever members against separation while permitting relative pivotal movement; and spring means engaging said grip portions to urge the jaw portions toward each other.

13. A spring clip as in claim 12 in which one of said grip portions has a slot therein; and the spring means is a bow-shaped spring having two arms joined by a bight portion; said arms bearing against the respective inside faces of the grip portions of the lever members, with said spring extending through said slot in said grip portion so that the bight portion of said spring is disposed outwardly of the outer surface of the lever member having said slot.

14. A spring clip as in claim 12 in which the spring means is a U-shaped spring having two arms joined by a bight portion, the arms each bearing against the respective inside surfaces of the grip portions of the members, the grip portion of said other lever member having a slot therein, said bight portion extending through the slot in the grip portion of said other lever member and engageable with the outside face of said other lever member.

15. A spring clip as in claim 14 which includes anchor means to hold the spring in said slot.

16. A spring clip as in claim 14 in which the spring has an aperture in one arm and said other lever member has a projection at one edge of said slot, said projection entering said aperture in said spring to hold said spring against shifting.

References Cited in the file of this patent

UNITED STATES PATENTS

| | | |
|---|---|---|
| 500,864 | Day | July 4, 1893 |
| 2,370,434 | Wolf | Feb. 27, 1945 |
| 2,687,737 | Schildt | Aug. 31, 1954 |
| 2,838,055 | Kertesz | June 10, 1958 |
| 3,047,927 | Braga | Aug. 7, 1962 |